United States Patent [19]
Kittaka

[11] Patent Number: 5,542,063
[45] Date of Patent: Jul. 30, 1996

[54] DIGITAL DATA PROCESSING SYSTEM WITH FACILITY FOR CHANGING INDIVIDUAL BITS

[75] Inventor: Mikio Kittaka, Ibaraki-ken, Japan

[73] Assignee: Canon Kabushiki Kaisha, Tokyo, Japan

[21] Appl. No.: 15,467

[22] Filed: Feb. 9, 1993

[30] Foreign Application Priority Data

Feb. 17, 1992 [JP] Japan ................................. 4-029412

[51] Int. Cl.⁶ .................................................. G06F 12/00
[52] U.S. Cl. ........................ 395/428; 395/432; 395/401; 365/189.02; 365/230.02
[58] Field of Search ............................ 395/425, 164–166, 395/401, 405, 431, 432, 481, 497.01, 421.01, 421.02, 428; 365/189.01, 189.02, 189.04, 189.05, 189.08, 230.01, 230.02, 230.06, 230.09

[56] References Cited

U.S. PATENT DOCUMENTS

| | | | |
|---|---|---|---|
| 3,905,024 | 9/1975 | Boucek et al. ........................... | 395/550 |
| 4,339,804 | 7/1982 | Davison et al. ......................... | 395/425 |
| 4,570,222 | 2/1986 | Oguchi et al. .......................... | 395/400 |
| 4,912,658 | 3/1990 | Sfarti et al. .............................. | 395/166 |

OTHER PUBLICATIONS

Hofacker, Winifred, ed. *Microcomputer Hardware Handbook*, Mar. 1982, pp. 619–624, 143.

*Primary Examiner*—Kee Mei Tung
*Attorney, Agent, or Firm*—Robin, Blecker, Daley & Driscoll

[57] ABSTRACT

A system for changing bits of a byte unit individually comprises a data processing unit including specifying circuitry for specifying bit selection information indicative of a predetermined bit in the byte unit, new-data generating circuitry for outputting new data for the predetermined bit, bit changing circuitry including a plurality of data holding circuits respectively for holding individual bits of the byte, gate circuitry receiving, as inputs, the new data and all bits of the byte and, as an enabling input, the bit selection information and transmitting the new data selectively to one of the data holding circuits.

12 Claims, 6 Drawing Sheets

DIGITAL DATA PROCESSING SYSTEM WITH FACILITY FOR CHANGING INDIVIDUAL BITS

BACKGROUND OF THE INVENTION

1. Field of the Invention

The present invention relates to a sequence controller having a data storing circuit for rewritably storing data such as coil data in byte units and a data processing part for processing the data stored in the byte units.

2. Description of the Related Art

Figure 1:
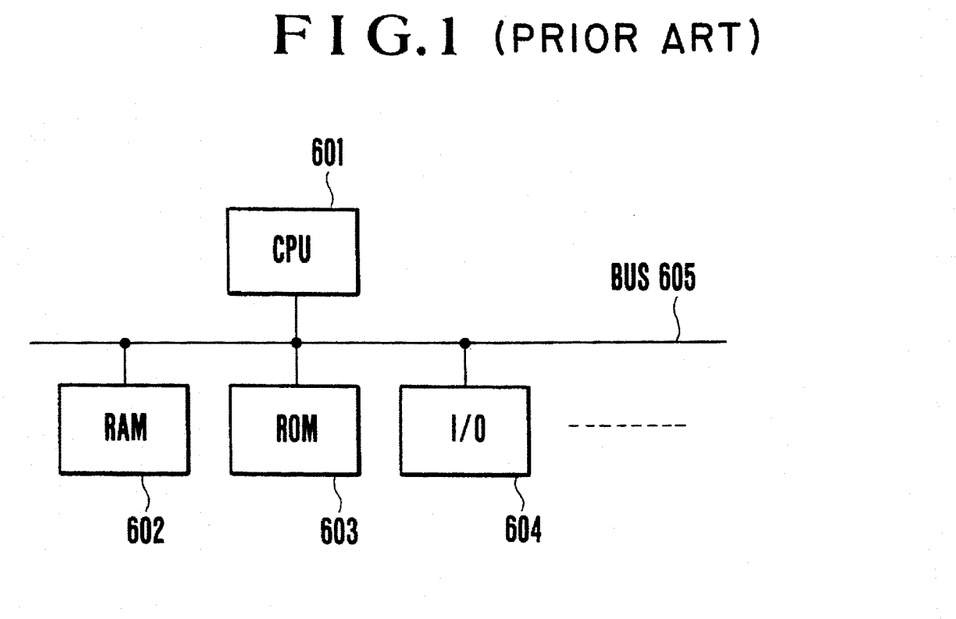
FIG. 1 is a block diagram showing a first example of a conventional sequence controller.
Figure 2:
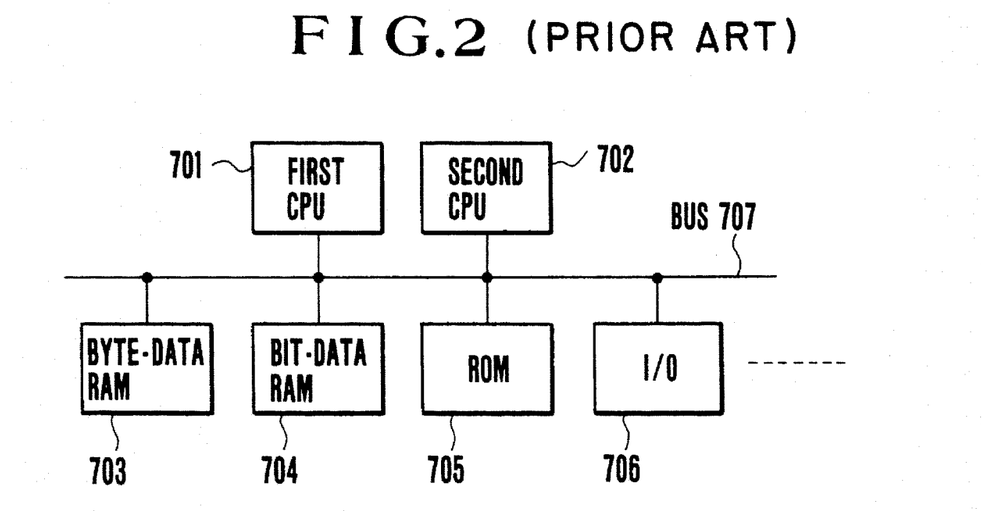
FIG. 2 is a block diagram showing a second example of the conventional sequence controller.
Figure 3:
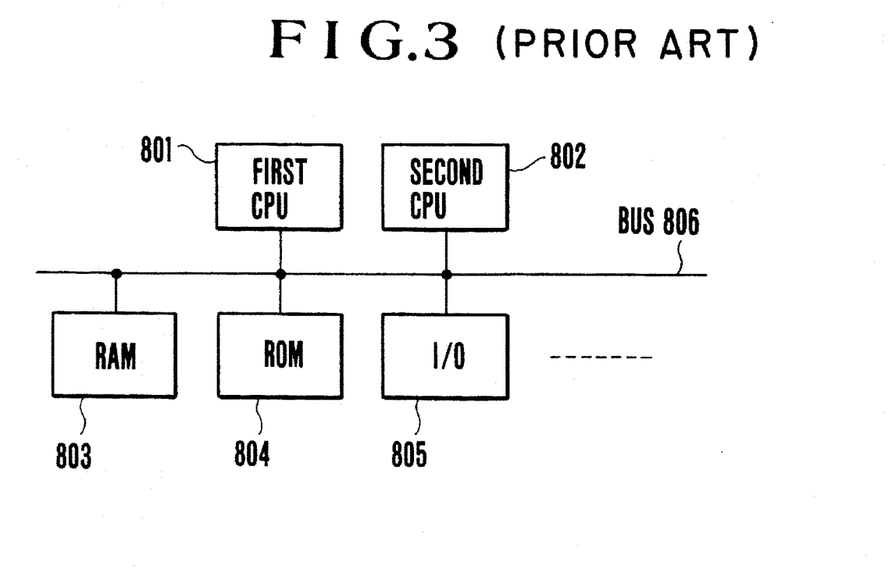
FIG. 3 is a block diagram showing a third example of the conventional sequence controller.

FIGS. 1, 2 and 3 show examples of a conventional sequence controller, respectively.

(1) The sequence controller shown in FIG. 1 includes a CPU (central processing unit) 601, a RAM (random access memory) 602 for storing byte data, a ROM (read only memory) 603 in which control procedures are stored, and an input/output part 604. The CPU 601, the RAM 602, the ROM 603 and the input/output part 604 are connected to one another by a bus 605. Change of bit data at an arbitrary bit in byte data is realized only by software.

(2) The sequence controller shown in FIG. 2 includes a first CPU 701 for handling byte data, a second CPU 702 for handling bit data, a byte-data RAM 703 for storing byte data, a bit-data RAM 704 for storing bit data, a ROM 705 in which control procedures are stored, and an input/output part 706. The first CPU 701, the second CPU 702, the byte-data RAM 703, the bit-data RAM 704, the ROM 705 and the input/output part 706 are connected to one another by a bus 707. To increase the operating speed of the sequence controller, the memory (the bit-data RAM 704) exclusively for storage of bit data and the CPU 702 exclusively for bit operation are provided.

(3) The sequence controller shown in FIG. 3 includes a general-purpose, first CPU 801, a second CPU 802 for executing bit instruction processing for the sequence controller, a RAM 803 for storing byte data, a ROM 804 in which control procedures are stored, and an input/output part 805. The general-purpose, first CPU 801, the second CPU 802, the RAM 803, the ROM 804 and the input/output part 805 are connected to one another by a bus 806. To increase of the operating speed of the sequence controller, the original CPU (the second CPU 802) for executing bit instruction processing for the sequence controller is provided.

However, the above-described conventional arts have the following problems, respectively.

(1) Since change of data at an arbitrary bit in byte data is realized only by software (refer to FIG. 1), several instructions are needed to process one coil instruction and it is, therefore, substantially impossible to increase the operating speed of the sequence controller.

(2) Since the memory (the bit-data RAM 704) exclusively for storage of bit data and the CPU 702 exclusively for bit operation are provided (refer to FIG. 2), the bit-data RAM 704 and the CPU 702 as well as a peripheral circuit for allowing the bus 707 to be shared by the bit-data RAM 704, the CPU 702 and the other elements are needed. This construction leads to an increase in the size of a printed circuit board as well as an increase in cost.

(3) Since the original CPU (the second CPU 802) for executing bit instruction processing for the sequence controller is provided (refer to FIG. 3), a peripheral circuit for allowing the bus 806 to be shared by the other CPU (the first CPU 801) and the CPU (the second CPU 802) for executing bit instruction processing for the sequence controller is needed. This construction leads to increases in development cost and other associated cost

SUMMARY OF THE INVENTION

An object of the present invention which has been made in the light of the problems of the respective conventional arts described above is, therefore, to provide a sequence controller having a simple construction and an increased processing speed.

To achieve the above object, in accordance with one aspect of the present invention, there is provided a sequence controller which includes a data storing circuit for rewritably storing data in byte units and a data processing part for processing the data stored in the byte units. The data processing part includes address specifying means for specifying write and read addresses relative to the data storing circuit and bit selection information indicative of a data change at a predetermined bit in the data, and new-data generating means for outputting new data relative to the predetermined bit. The sequence controller also includes an arbitrary-bit changing circuit which has a plurality of data holding circuits for holding the aforesaid data by one bit each, a decoder for identifying a bit indicated by the bit selection information specified by the address specifying means, a gate circuit for transmitting the new data to a data holding circuit corresponding to the bit identified by the decoder, among the plurality of data holding circuits, while transmitting data read from the data storing circuit to the other data holding circuits, and a data outputting circuit for outputting the data held in the plurality of data holding circuits to the data storing circuit.

In accordance with the above-described sequence controller, in the data processing part, coil data are read from the data storing circuit and bit selection information for executing a data change is specified and, in the arbitrary-bit changing circuit, a bit at which the data change is to be executed is identified and the data at the bit is changed. Coil data obtained after the data change has been executed is held and transmitted to the data storing circuit. Accordingly, in the data processing part, it is possible to effect rewriting of the coil data only by the simple operation of reading the coil data from the data storing circuit.

The above and other objects, features and advantages of the present invention will become apparent from the following detailed description of a preferred embodiment of the present invention, taken in conjunction with the accompanying drawings.

DETAILED DESCRIPTION OF THE PREFERRED EMBODIMENT

A preferred embodiment of the present invention will be described below with reference to the accompanying drawings.

Figure 4:
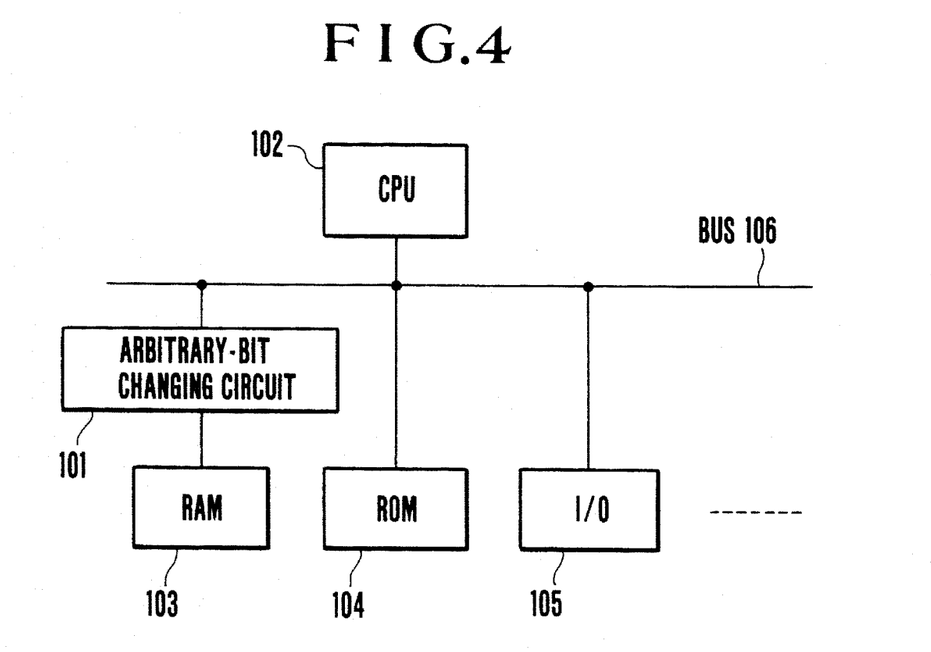
FIG. 4 is a block diagram showing one embodiment of a sequence controller according to the present invention.

FIG. 4 is a block diagram showing the embodiment of a sequence controller according to the present invention.

The present embodiment of the sequence controller includes an arbitrary-bit changing circuit 101, a general-purpose CPU 102, a RAM 103 for storing byte data, a ROM 104 in which control procedures are stored, and an input/output circuit (I/O) 105. The arbitrary-bit changing circuit 101, the general-purpose CPU 102, the RAM 103, the ROM 104 and the input/output circuit (I/O) 105 are connected to one another by a bus 106.

Figure 5:
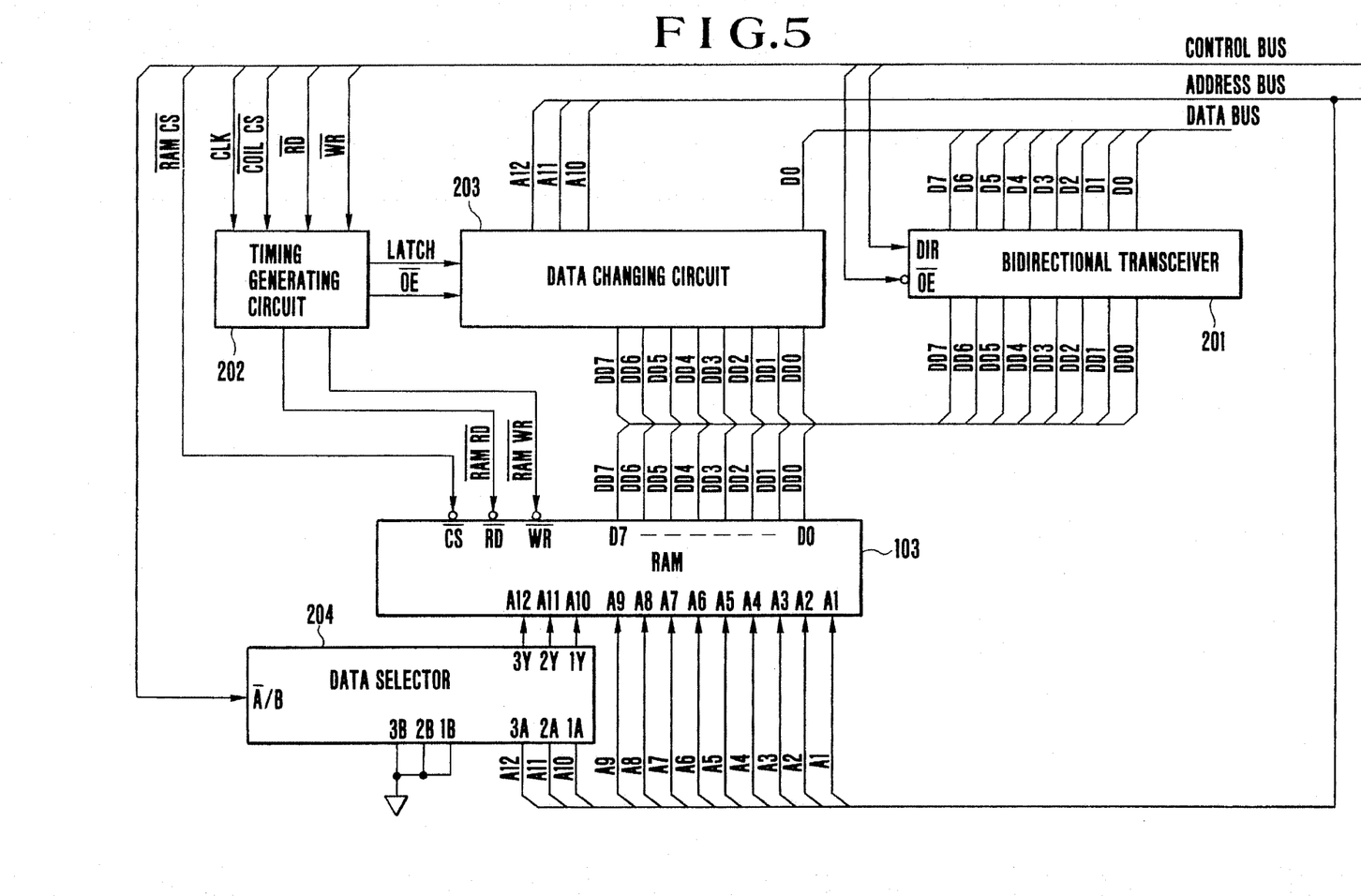
FIG. 5 is a block diagram showing one example of an arbitrary-bit changing circuit used in the sequence controller shown in FIG. 4.

As shown in FIG. 5, the arbitrary-bit changing circuit 101 includes a bidirectional transceiver 201, a timing generating circuit 202, a data changing circuit 203 and a data selector 204.

In the present embodiment, data are inputted or outputted to or from the RAM 103, normally through the bidirectional transceiver 201 by selecting an input A of the data selector 204 of the arbitrary-bit changing circuit 101 shown in FIG. 5. In the present embodiment, coil data are stored in a lower-order area (all of addresses A10 to A12 are set to their low levels) of the RAM 103.

As shown in FIG. 5, if the CPU 102 (refer to FIG. 4) accesses a coil-data change area in a write cycle, the timing generating circuit 202 outputs a $\overline{\text{RAM RD}}$ signal, a LATCH signal, an $\overline{\text{OE}}$ signal and a $\overline{\text{RAM WR}}$ signal in synchronism with a CPU clock signal CLK.

The $\overline{\text{RAM RD}}$ signal is a timing signal which requests output of coil data stored in the RAM 103.

The LATCH signal is a signal which requests the data changing circuit 203 to store new coil data therein.

The $\overline{\text{OE}}$ signal is a signal which requests the data changing circuit 203 to output the new coil data to the RAM 103.

The $\overline{\text{RAM WR}}$ signal is a signal which instructs the RAM 103 to rewrite coil data thereof.

Figure 6:
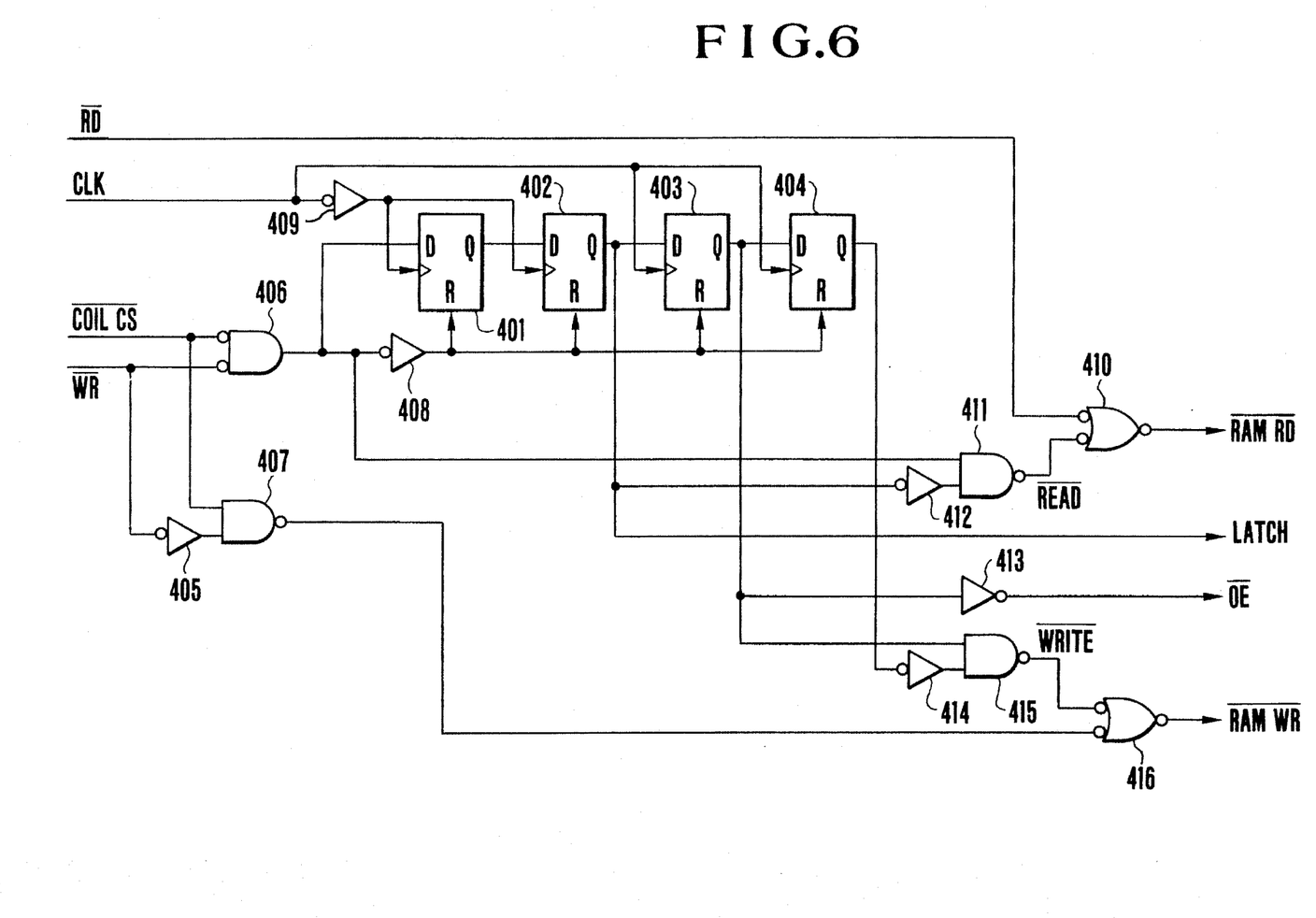
FIG. 6 is a circuit diagram showing one example of a timing generating circuit of the arbitrary-bit changing circuit.

As shown in FIG. 6, the timing generating circuit 202 of the present embodiment includes four D flip-flops 401, 402, 403 and 404, six inverters 405, 408, 409, 412, 413 and 414, a NOR gate 406, three NAND gates 407, 411 and 415, and two AND gates 410 and 416.

Figure 7:
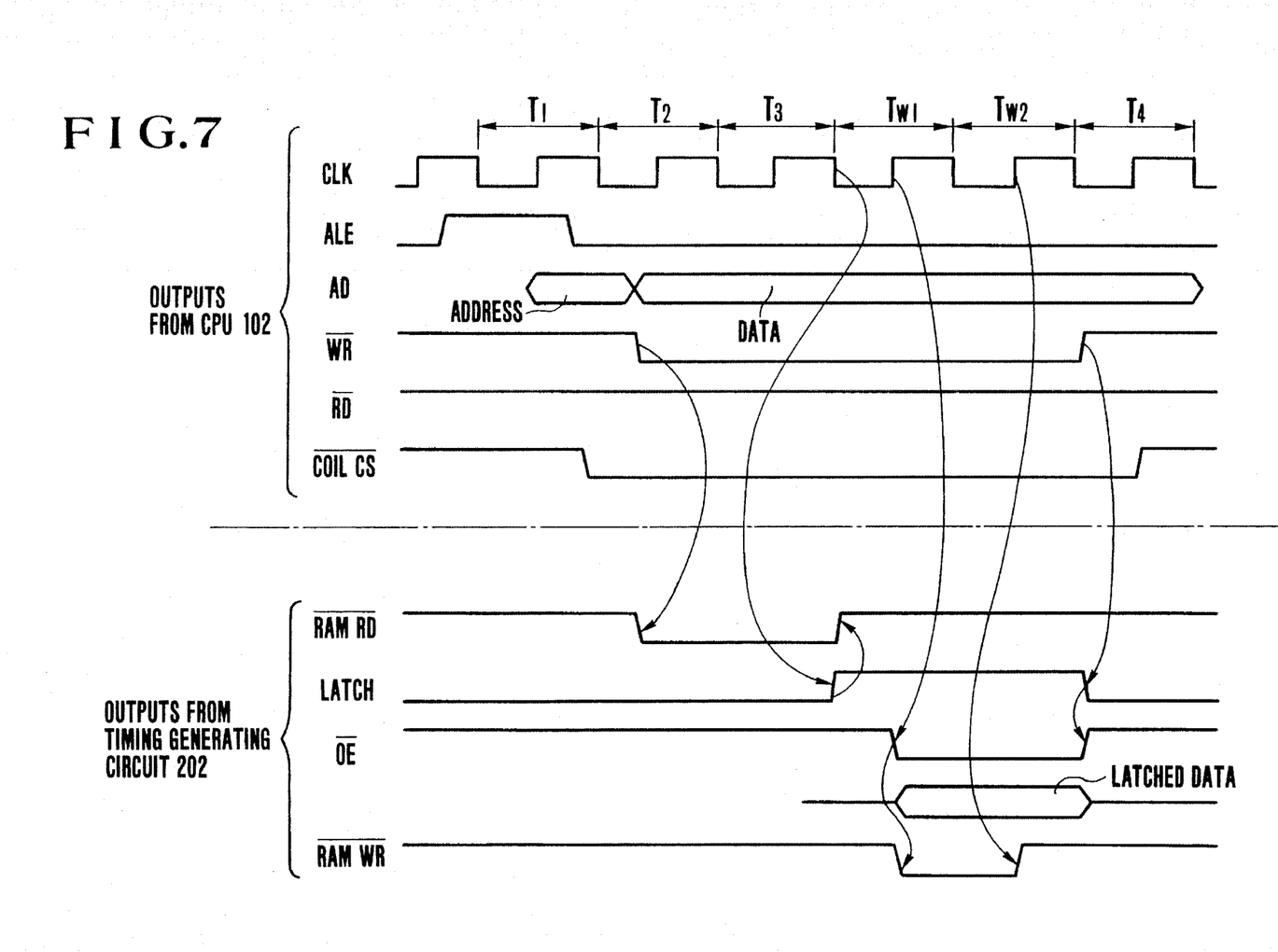
FIG. 7 is a timing chart showing one example of the timing of the input and output signals of the timing generating circuit of the arbitrary-bit changing circuit.

The timing of the input and output signals of the timing generating circuits 202 will be described below with reference to FIGS. 6 and 7.

In the conventional arrangement, the aforesaid write cycle is generally formed by a period equivalent to four clock pulses (T1+T2+T3+T4). However, in the present embodiment, to allow the arbitrary-bit changing circuit 101 to operate, the write cycle is formed by a period equivalent to such four clock pulses plus two clock pulses (Tw1+Tw2).

First of all, when an address latch enable (ALE) signal for latching an address signal is outputted from the CPU 102, counting of the period is initiated at the fall of the clock pulse CLK which appears immediately after the ALE signal has been outputted. After a small delay (5 to 40 ns) from this time, an address is outputted in response to an address/data (AD) signal. Then, after a small delay from the rise of the next clock pulse CLK, a $\overline{\text{COIL CS}}$ signal for selecting a chip in which coil data is to be memorized is outputted. Then, after a small delay from the fall of the aforesaid clock pulse CLK (i.e., after a small delay from the passage of T1), a $\overline{\text{WR}}$ signal is outputted and data is simultaneously outputted as the AD signal. In synchronism with the $\overline{\text{WR}}$ signal, the $\overline{\text{RAM RD}}$ signal is outputted from the timing generating circuit 202 and the data of the RAM 103 is read into the data changing circuit 203. Then, when T3 passes (at the fall of the third clock pulse CLK), the LATCH signal is outputted from the timing generating circuit 202 and the data is stored in the data changing circuit 203 and, at the same time, the output of the $\overline{\text{RAM RD}}$ signal is brought to an end. Then, at the rise of the succeeding clock pulse CLK, the $\overline{\text{OE}}$ signal is outputted and the data is outputted from the data changing circuit 203 to the RAM 103 and, at the same time, the $\overline{\text{RAM WR}}$ signal is outputted, so that the RAM 103 initiates storing the data. Then, at the rise of the following clock pulse CLK, the output of the $\overline{\text{RAM WR}}$ signal is brought to an end. After a small delay from the fall of this clock pulse CLK, the output of the $\overline{\text{WR}}$ signal from the CPU 102 is brought to an end, and the output of each of the LATCH signal and the $\overline{\text{OE}}$ signal is also brought to an end in synchronism with this timing.

Figure 8:
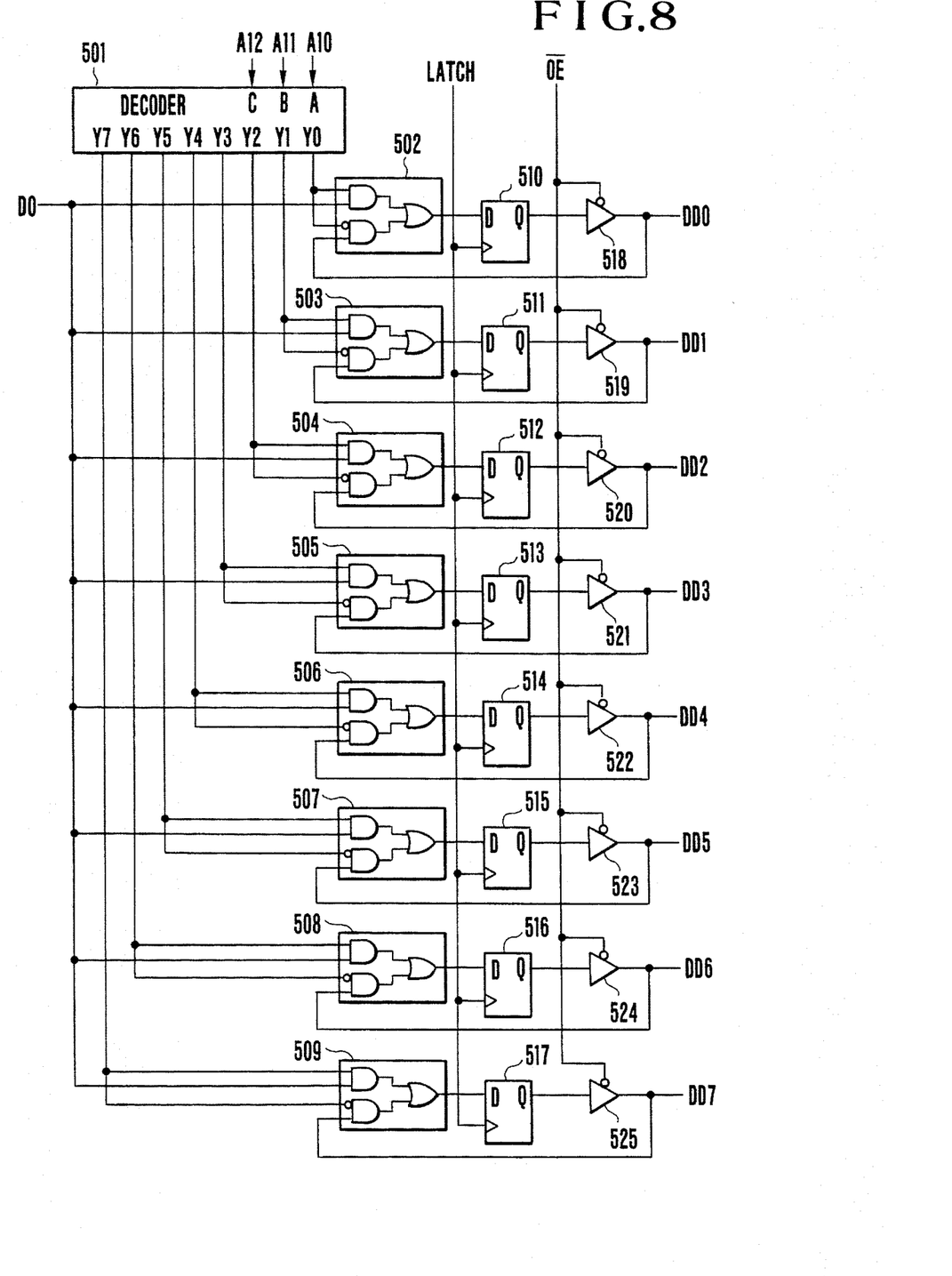
FIG. 8 is a circuit diagram showing one example of a data changing circuit of the arbitrary-bit changing circuit.

The data changing circuit 203 will be described below.

As shown in FIG. 8, the data changing circuit 203 includes a decoder 501 having three bit inputs, eight gate circuits 502 to 509, eight D flip-flops 510 to 517 and eight tristate gates 518 to 525.

The data changing circuit 203 used in the present embodiment effects rewriting of the aforesaid coil data by setting a state (the state of D0) specified by the CPU 102 in one of the D flip-flops 510 to 517 which corresponds to a bit specified by bit selection addresses (A10, A11, A12) indicative of a selected bit, as well as by setting the other bits in the other D flip-flops, respectively.

The coil-data rewriting operation executed by the data changing circuit 203 will be described below with illustrative reference to a case wherein the first bit is selected as a target for data change.

It is assumed here that the initial state of the $\overline{\text{OE}}$ signal is selected to be high (refer to FIG. 7) and that the initial states of the tristate gates 518 to 525 are selected to be of high impedance.

First of all, the bit selection addresses (A10, A11, A12) are inputted to the decoder 501 in the state of (high, low, low). At this time, among outputs Y0 to Y7 of the decoder 501, the output Y1 is set to the high level and all the others are set to their low levels. Accordingly, among the gate circuits 502 to 509 to each of which the rewriting data D0 is inputted, only the gate circuit 503 to which the output Y1 is connected is allowed to transmit the rewriting data D0 to the D flip-flop 511. The other gate circuits 502 and 504 to 509 transmit data DD0 and DD2 to DD7 read from the RAM 103 to the respective D flip-flops 510 and 512 to 517. Then, when the LATCH signal is inputted to each of the D flip-flops 510 to 517, the data transmitted through the gate circuits 502 to 509 are respectively set in the D flip-flops 510 to 517. Then, when the $\overline{\text{OE}}$ signal is set to its low level (refer to FIG. 7) after the RAM 103 has been switched to the write cycle, the data set in the respective D flip-flops 510 to 517 are outputted through the corresponding tristate gates 518 to 525 as the coil data DD0 to DD7 which have been changed, and the changed coil data DD0 to DD7 are respectively written to predetermined addresses in the RAM 103.

The operation of the present invention will be described below.

While the CPU 102 is accessing the coil-data change area in the write cycle, the data selector 204 of the arbitrary-bit changing circuit 101 selects an input B to set the lower-order addresses (A10, A11, A12) to their low levels.

Then, at the timing of the $\overline{\text{RAM RD}}$ signal, the RAM 103 outputs coil data in byte units. The coil data outputted at this time are coil data which have not yet been changed.

Then, at the timing of the LATCH signal, in the data changing circuit 203, the data D0 specified by the CPU 102 is set in the D flip-flop corresponding to a bit specified by the bit selection addresses (A10, A11, A12), while the output data of the RAM 103 are respectively set in the D flip-flops corresponding to the other bits.

Then, at the timing of the $\overline{\text{RAM WR}}$ signal, the RAM 103 is switched to the write cycle. After that, the data set in the respective D flip-flops 510 to 517 of the data changing circuit 203 are transmitted to the RAM 103 at the timing of the $\overline{\text{OE}}$ signal. The data inputted in the RAM 103 at this time are coil data which have been changed, and the changed coil data are written to predetermined addresses.

In the above-described manner, in executing coil processing, the CPU 102 can change the coil data in bit units by one instruction (for example, MOV [address], AL] by specifying the bit selection addresses (A10, A11, A12) as well as coil data addresses (A1 to A9) and writing new coil bit information (D0) into the corresponding coil-data change area.

As is apparent from the foregoing description, in accordance with the above-described embodiment, rewriting of coil data can be effected by a data processing part executing the simple operation of reading the coil data from a coil-data storing circuit and outputting new data. Accordingly, it is advantageously possible to simplify the software needed in the data processing part, whereby it is possible to achieve a reduction in the price of the sequence controller as well as an increase in the operating speed thereof. In addition, since the arbitrary-bit changing circuit can be formed by a general-purpose digital circuit such as a decoder or a gate circuit, it is possible to achieve the simplification of the hardware arrangement as well as a further reduction in the price.

What is claimed is:

1. A system for changing bits of a byte unit individually, comprising:

(a) data storing means for rewritably storing data in byte units;

(b) data processing means including:
    specifying means for specifying write and read addresses for storage locations in said data storing means and bit selection information indicative of a predetermined bit in a byte unit, said byte unit being comprised of said predetermined bit and other bits; and
    new-data generating means for outputting new data for the predetermined bit; and (c) bit changing means including:
    a plurality of data holding means respectively for holding said predetermined bit and said other bits;
    a decoder for decoding the bit selection information specified by said specifying means, said decoder enabling a corresponding one of a plurality of outputs thereof;
    gate means comprising a plurality of gating circuits each receiving as a data input said new data and as an enabling input one of said outputs of said decoder for transmitting the new data selectively to one of said data holding means holding said predetermined bit and transmitting the other bits of said byte to data holding means other than said one data holding means; and
    data outputting means for outputting the data held in said plurality of data holding means to said data storing means.

2. A system according to claim 1, wherein said data storing means, said data processing means and said bit changing means are connected by connection means inclusive of a bus.

3. A system according to claim 2, wherein said connection means is inclusive of a bidirectional transceiver.

4. A system according to claim 1, wherein said data storing means is a random access memory.

5. A system according to claim 4, wherein the data stored by said data storing means are stored in a predetermined area in the random access memory.

6. A system for changing bits of a byte unit individually, comprising:

(a) data storing means for rewritably storing data in byte units;

(b) data processing means connected with said data storing means, said data processing means including:
    specifying means for specifying write and read addresses for storage locations in said data storing means and bit selection information indicative of a predetermined bit in a byte unit, said byte unit being comprised of a preselected number of bits;
    new-data generating means for outputting new data for the predetermined bit; and (c) data changing means for substituting, for data stored in said data storing means, the new data outputted from said new-data generating means, by using the write and read addresses and the bit selection information outputted from said specifying means, said data changing means including circuits corresponding in number to the preselected number of bits of said byte, unit each said circuit having said new data outputted from said new-data generating means input thereto.

7. A system according to claim 6, further comprising timing signal generating means for controlling timing for substituting, for the data stored in said data storing means, the new data outputted from said new-data generating means upon receipt by said timing signal generating means of a signal outputted from said data processing means.

8. A system according to claim 7, wherein said data processing means outputs a clock pulse as said signal and said timing signal generating means controls the timing in synchronism with the clock pulse.

9. A system for changing bits of a byte unit individually, comprising:

(a) data processing means including:
    specifying means for specifying bit selection information indicative of a predetermined bit in the byte unit; and
    new-data generating means for outputting new data for the predetermined bit; and (b) bit changing means receiving said bits of said byte, said bit selection information and said new data, said bit changing means including:

a plurality of data holding means respectively for holding the received individual bits of said byte;

a plurality of gate means each receiving as inputs said received new data and as an enabling input said received bit selection information for transmitting the received new data selectively to one of said data holding means.

10. A system according to claim 9, wherein said byte comprises said predetermined bit and other bits and wherein said gate means transmits said other bits of said byte to data holding means other than said one data holding means.

11. A system for changing bits of a byte unit individually, comprising:

(a) data processing means including:

specifying means for specifying bit selection information indicative of a predetermined bit in the byte unit; and new-data generating means for outputting new data for the predetermined bit; and (b) bit changing means receiving said bits of said byte, said bit selection information and said new data, said bit changing means including:

a plurality of data holding means respectively for holding individual received bits of said byte;

decoding means for decoding the received bit selection information specified by said specifying means, said decoder enabling a corresponding one of a plurality of outputs thereof;

a plurality of gate means each receiving as inputs said new data and as an enabling input said outputs of said decoding means for transmitting the received new data selectively to one of said data holding means.

12. A system according to claim 11, wherein said byte comprises said predetermined bit and other bits and wherein said gate means transmits said other bits of said byte to data holding means other than said one data holding means.

* * * * *